United States Patent Office 3,714,986
Patented Feb. 6, 1973

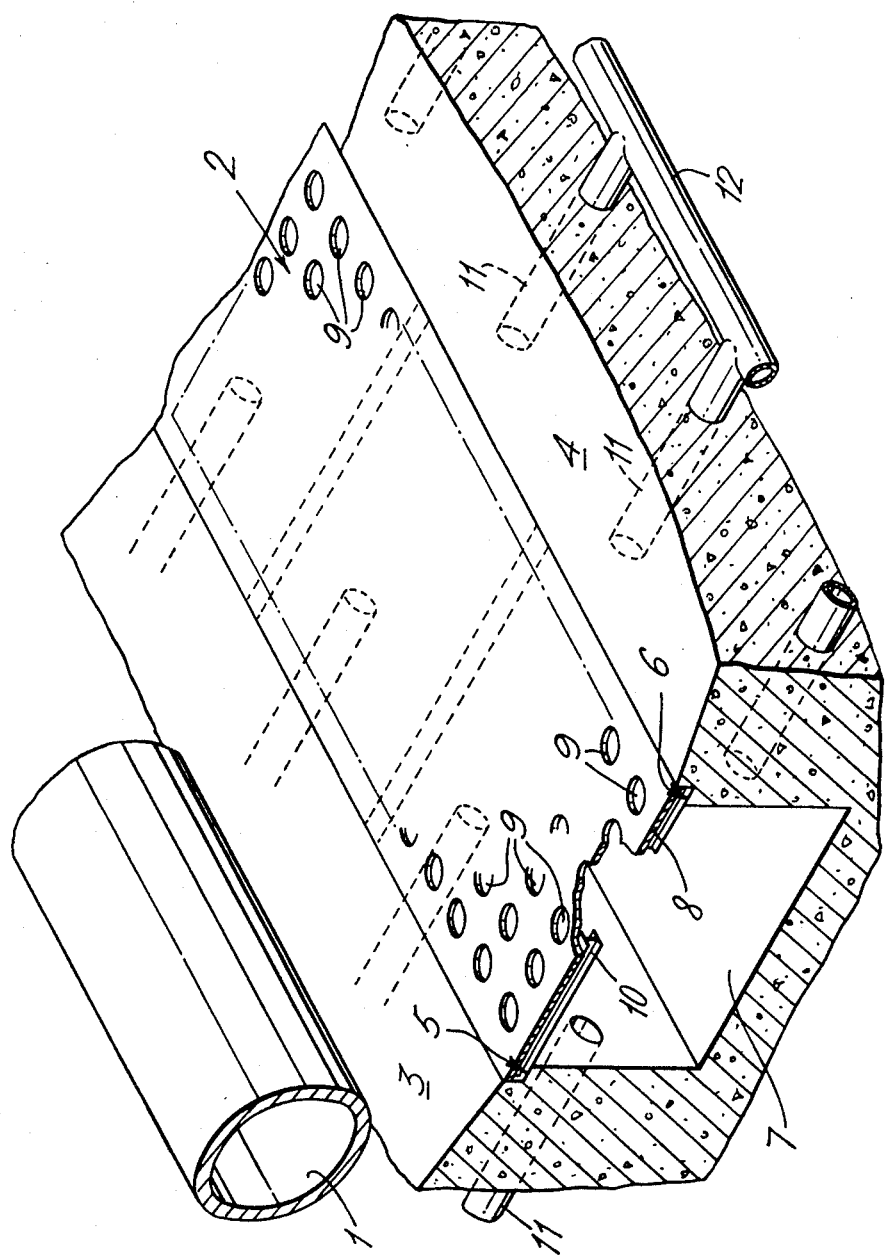

3,714,986
METHOD OF AND MEANS FOR COMBATING SODIUM FIRES
Donald Broadley, Warrington, England (% United Kingdom Atomic Energy Authority, 11 Charles II St., London SW. 1, England)
Filed Dec. 7, 1970, Ser. No. 95,560
Claims priority, application Great Britain, Dec. 17, 1970, 61,606/70
Int. Cl. A62c 1/00
U.S. Cl. 169—1 A       7 Claims

ABSTRACT OF THE DISCLOSURE

Spreading of particulate material such as vermiculite or perlite onto a porous plate beneath which is a trough into which burning sodium is conducted serves to prevent the spread of sodium fumes to operating areas. Inert gas supply to the space between the perforated plate and the burning sodium in the trough puts out the sodium fire.

BACKGROUND OF THE INVENTION

This invention relates to a method of and means for combating sodium fires in plant which employs sodium in liquid (molten) form. An example of such plant is a sodium-cooled fast breeder nuclear reactor for the generation of power.

In sodium-cooled fast breeder nuclear reactors, it is customary to transfer heat in the reactor core to flowing liquid sodium, such heated sodium being conducted to one or more primary heat exchangers in which heat is transferred to a secondary heat transfer fluid, also sodium, which is passed to steam generating heat exchangers, the generated and superheated steam being employed in a prime mover such as a turbine to generate power. Whilst the primary heat exchangers are usually disposed in a shielded vessel which also contains the reactor core, a sodium pool in which the core is submerged, and pumps to induce sodium flow between core and primary heat exchangers, the secondary sodium is usually conveyed out of the reactor tank to the steam generating heat exchangers which are disposed externally of the tank. This necessitates the employment of large-bore pipes to convey the sodium, and should leakage occur in any of such pipes, or should such pipes fracture under a fault condition, hot liquid sodium coming into contact with the air environment of the pipes is likely spontaneously to ignite and to continue burning so long as the supply of sodium lasts. The fumes produced by the burning sodium will be copious and will quickly render the surrounding area untenable by operating personnel, which could endanger the safety of the whole reactor plant.

It is known that if burning sodium is allowed to fall through a perforated plate into a container below the plate and sealed thereto, smoke and fume from the burning sodium will be somewhat reduced.

It is an object of the present invention to provide a method of and means for still further reducing the hazard from burning sodium compared with known methods and means.

DESCRIPTION OF THE INVENTION

According to the invention a method of combating sodium fires, arising from escape of molten sodium from a conduit or containing vessel for the molten sodium comprises the steps of directing escaping molten sodium to fall through a perforated plate, catching and retaining the molten sodium in a container sealed to and disposed below said perforated plate, followed by the step of spreading non-hygroscopic, non-toxic dry particulate material to form a blanket on said perforated plate, the particle size of said particulate material being such that a significant proportion of the particulate material is retained on the perforated plate, said particulate material being compatible with sodium and the material of the perforated plate.

One example of a suitable particulate material is delaminated exfoliated vermiculite. Another example of a suitable particulate material is perlite.

Preferably the method in accordance with the invention also includes the further step of establishing and maintaining an inert non-combustion-supporting atmosphere between the container ad the perforated plate.

Apparatus for carrying out a method of combating sodium fires according to the invention may comprise a perforated plate, a container disposed beneath said perforated plate, means sealing between the container and the perforated plate, means for directing molten sodium escaping from a conduit or containing vessel therefor to fall through the perforated pate and to be caught and retained in the container and means for spreading non-hygroscopic, non-toxic, dry particulate material to form a blanket on said perforated plate.

The perforated plate and container are preferably situated to one side of the region vertically below the conduit or containing vessel for the sodium, said means for directing molten sodium escaping from the conduit or containing vessel comprising an inclined surface extending laterally from the region vertically below the conduit or containing vessel and leading to the perforated plate.

DESCRIPTION OF THE DRAWING

A constructional example embodying the invention will now be described with reference to the accompanying drawing the sole figure of which is a fragmentary, diagrammatic perspective view.

DESCRIPTION OF THE PREFERRED EMBODIMENT

Referring to the drawing, in the construction of means for combating sodium fires illustrated therein, we provide, in proximity to large sodium-carrying pipes (one of which is shown, designated 1) spanning the operating area of a large sodium-cooled, power generating fast breeder nuclear reactor, walkways (one of which is shown) designated 2) arranged to extend in directions convenient to the mobility and discharge of duties of the operating personnel. The walkways are not situated beneath the personnel, but are disposed well to one side, as shown in the drawing. Beneath the pipes is a concrete apron 3 which is inclined downwardly towards one side of the walkway 2, there being a similar concrete apron 4 inclined downwardly at the other side of the walkway 2. The walkway 2 is conveniently supported by a plurality of cross beams, one of which is shown in the drawing designated 10, spanning between ledges 5, 6 formed in the aprons 3, 4. A trough 7 extends beneath the walkway 2 for the full extent of the latter.

The walkway 2 is constituted by a metal plate 8 conveniently ⅛" thick, and having perforations 9 which are either circular section (as shown), or, more conveniently from the point of view of manufacture, square section. The diameter or width, as the case may be, of the perforations 9 is preferably ⅜" and certainly no less than ¼", since with any less dimesion, surface tension would inhibit free flow of sodium therethrough. Conversely the perforations should not be so large that the granuless ubsequently referred to can pass therethrough. The perforations 9 are spaced so as to provide 30% open area. Conveniently the trough 7 is about 1 ft. deep and is designed to accept all the sodium from a leaking pipe 1 whilst leaving a space of at least 3" between the top of the sodium and the walkway 2.

Means for supplying non-hygroscopic, non-toxic dry granules to the top surface of the walkway 2 from above is provided, although not shown in the drawing. Such means conveniently comprises a conventional hopper and a spreader connected thereto, with a hold-up valve which when operated releases the said granules stored in the hopper to fall and be spread over the walkway 2. Ideally, where vermiculite constitutes the material of the granules, the granules should lie about 3" deep on the walkway after spreading. Where vermiculite is employed, this should be delaminated and exfoliated and of an average particle size such that substantially no granules pass through the perforations 9 of the plate 8.

The trough 7 has provision for providing and maintaining an inert atmosphere beneath the walkway 2. This is conveniently provided by inert gas supply pipes 11 communicating with both sides of the trough 7 through the concrete constituting the aprons 3, 4, the pipes 11 being joined to a ring main, only a fragment thereof being shown, designated 12, from a supply of inert gas, the ring main 12 having a control system (not shown) operable rapidly to provide an inert gas purge of the space beneath the walkway 2 and having established an inert gas atmosphere therein, to thereafter continue changing the inert gas atmosphere, for example at a rate of 10 changes of volume per hour. A suitable inert gas is argon.

In operation, should a sodium pipe 1 develop a serious leak, hot sodium leaking therefrom will spontaneously ignite in the air environment and will fall on the respective apron 3 or 4, and will run down the apron on to the plate 8 constituting the walkway 2, falling into the trough 7 via the perforations 9. The sodium in the trough 7 will continue to burn, but the presence of the perforated plate 8 constituting the walkway 2 will reduce the spread of fume to the operating space of the reactor. The establishing and changing of the inert atmosphere will have been initiated following the detection of sodium fume in the operating atmosphere; the spreading of the granules on to the plate 8 is delayed either at operator discretion or by a suitable automatic control until the sodium has ceased to flow from the pipe 1 and is all in the trough 7. The result of spreading the granules is to form a blanket with minimum porosity which will confine substantially all the fume, thus largely preventing any major concentration of fume from spreading to operating areas where it could prejudice reactor safety. Furthermore, the inert atmosphere beneath the plate 8, which is at a slightly higher pressure than the outside environment, prevents inleakage of any air through the blanket (which in any case has minimum porosity), and thus the sodium, deprived of any combustion-supporting environment, ceases to burn. The experience is that it takes several hours to cool down to solidifying temperatures, whereafter it can be removed and the aprons, plate and trough can be cleaned.

I claim:

1. A method of combating sodium fires, arising from escape of molten sodium from a conduit or containing vessel for the molten sodium comprising the steps of directing escaping molten sodium to fall through a perforated plate, catching and retaining the molten sodium in a container sealed to and disposed below said perforated plate, followed by the step of spreading non-hygroscopic, non-toxic dry particulate material to form a blanket on said perforated plate, the particle size of said particulate material being such that a significant proportion of the particulate material is retained on the perforated plate, said particulate material being compatible with sodium and the material of the perforated plate.

2. A method of combating sodium fires as claimed in claim 1 wherein said particulate material is delaminated exfoliated vermiculite.

3. A method of combating sodium fires as claimed in claim 1 wherein said particulate material is perlite.

4. A method of combating sodium fires as claimed in claim 1 including the further step of establishing and maintaining an inert non-combustion-supporting atmosphere between the container and the perforated plate.

5. Apparatus for carrying out a method for combating sodium fires, arising from escape of molten sodium from a conduit or containing vessel for the molten sodium, comprising a perforated plate, a container disposed beneath said perforated plate, means sealing between the container and the perforated plate, means for directing molten sodium escaping from the conduit or containing vessel therefor to fall through the perforated plate and to be caught and retained in the container and means for spreading non-hygroscopic, non toxic dry particulate material to form a blanket on said perforated plate, the particle size of the particulate material being such that a significant proportion of the particulate material is retained on the perforated plate, said particulate material being compatible with sodium and the material of the perforated plate.

6. Apparatus for carrying out a method for combating sodium fires as claimed in claim 5 wherein means are provided for feeding inert gas to the container below the perforated plate in order to establish an inert, non-combustion-supporting atmosphere in the space between the perforated plate and the container.

7. Apparatus for carrying out a method for combating sodium fires as claimed in claim 5 wherein the perforated plate and container are situated to one side of the region vertically below the conduit or containing vessel for the sodium, said means for directing molten sodium escaping from the conduit or containing vessel comprising an inclined surface extending laterally from the region vertically below the conduit or containing vessel and leading to the perforated plate.

References Cited

UNITED STATES PATENTS

| 3,600,312 | 8/1971 | Bohland | 252—2 X |
| 3,407,138 | 10/1968 | Harper et al. | 252—2 |
| 3,207,672 | 9/1965 | Costes | 176—38 |

M. HENSON WOOD, Jr., Primary Examiner

T. C. CULP, Jr, Assistant Examiner

U.S. Cl. X.R.

169—2 R